J. ROCHE AND R. J. PARKER.
WATER TREATING APPARATUS.
APPLICATION FILED FEB. 7, 1919.
1,371,814.
Patented Mar. 15, 1921.
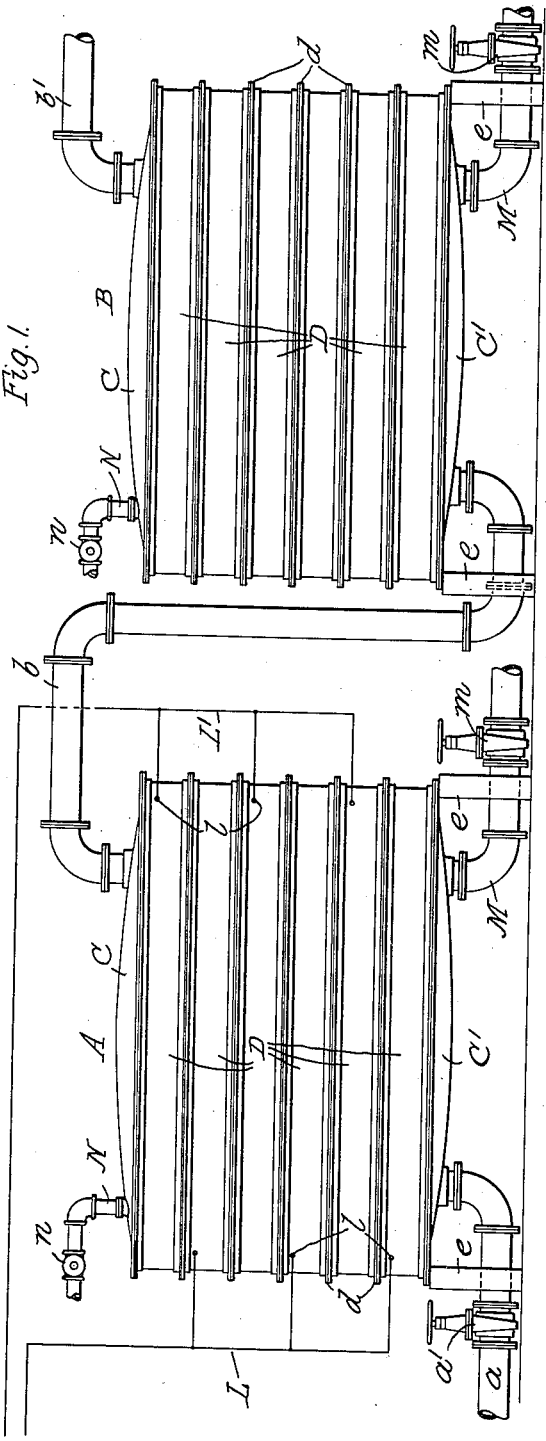
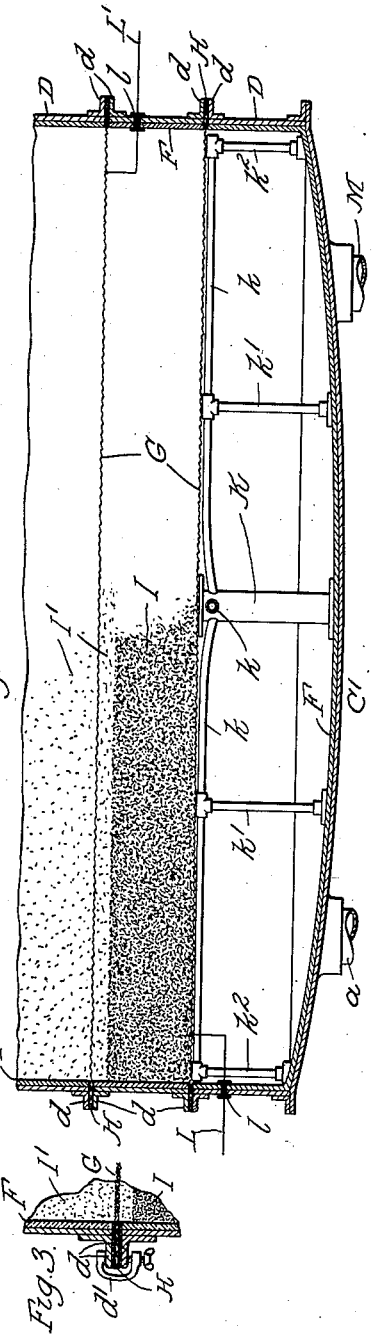
INVENTORS.
John Roche
and
Raymond J. Parker
By Wilhelm & Parker
ATTORNEYS.

UNITED STATES PATENT OFFICE.

JOHN ROCHE AND RAYMOND J. PARKER, OF BUFFALO, NEW YORK, ASSIGNORS TO ELECTRIC TWIN WATER PURIFICATION CORPORATION, OF BUFFALO, NEW YORK.

WATER-TREATING APPARATUS.

1,371,814.      Specification of Letters Patent.      Patented Mar. 15, 1921.

Application filed February 7, 1919. Serial No. 275,558.

*To all whom it may concern:*

Be it known that we, JOHN ROCHE and RAYMOND J. PARKER, citizens of the United States, residing at Buffalo, in the county of Erie and State of New York, have invented a new and useful Improvement in Water-Treating Apparatus, of which the following is a specification.

This invention relates to apparatus for use in purifying, softening, or otherwise treating water and removing undesirable matter therefrom.

The objects of the invention are to provide an apparatus of this kind which is so constructed and organized as to effect an efficient and thorough treating of water for the purpose of rendering the same more desirable for drinking, for use in boilers, or for other purposes; also to so construct the apparatus as to enable the same to be readily and easily cleaned and sterilized; also to construct an apparatus of this kind in sections which are separated by means of gaskets of improved construction; also to improve the construction of apparatus of this kind in other respects hereinafter specified.

In the accompanying drawings:

Figure 1 is an elevation of an apparatus embodying the invention.

Fig. 2 is a fragmentary sectional elevation of a portion of the apparatus on an enlarged scale.

Fig. 3 is a fragmentary sectional elevation thereof on a still larger scale.

Briefly stated, the apparatus embodying the invention shown in the drawings comprises one or more tanks provided with layers of suitable purifying or cleansing material through which the water flows, and preferably having electric conductors arranged in the tanks and insulated therefrom to cause electricity to pass through the liquid while being treated. Each of the tanks is preferably constructed of a plurality of sections adapted to be secured together and to support a screen or analogous device through which the electricity is introduced to the water, and on which the purifying or treating substance rests. The interior of the tanks is preferably glazed or otherwise coated with a nonconducting material which also facilitates the cleansing of the tanks.

The apparatus shown in the drawings includes two tanks or receptacles A B, the water passing first through the tank A and then through the tank B. The two tanks are, except as hereinafter specified, identical in construction, and if desired only one of these tanks may be used or the two tanks may be combined into a single tank of larger size. Since the two tanks are substantially identical in construction, the tank A only will be described in detail. The water to be treated is passed into the tank A by means of an inlet pipe $a$ controlled by a valve $a'$ of any suitable kind and a pipe $b$ connects the two tanks, receiving the water which has been treated in the tank A, and transmitting it to the tank B. $b'$ represents a pipe for discharging the water which has been treated from the tank B.

The tanks may be of any suitable or desirable structure, those shown in the drawings being provided with upper and lower heads C C' which are preferably somewhat dished in form so as to enable the same to better withstand the pressure of the water within the tanks. Each tank also includes a plurality of body portions or members D which may be annular in form and which are provided with any suitable means for connecting the members to each other and to the heads C C'. In the construction shown for this purpose, each of the members D is provided with outwardly extending flanges $d$ which may be secured together by any suitable means, such as clamps $d'$ or the like. Each tank rests on suitable legs or supporting members $e$. The interior surface of the tanks is preferably glazed or otherwise coated with a hard, smooth non-porous material which is adapted to facilitate the cleaning of the interior of the tanks and which also acts as a non-conductor of electricity. F, Figs. 2 and 3, represents the lining of the tank.

Each tank is preferably divided into a plurality of divisions or compartments by means of suitable perforate partition plates, screens or the like G, which will permit the free passage of the water upwardly through the tank. These plates or screens may be secured in their operative positions in any desired manner. In the construction shown for this purpose the plates are held between the flanges $d$ of the annular body portions D of the tanks, and in order to permit a water tight connection between the flanges and the screens G and also to insulate the screens from the walls of the tanks, gaskets H are employed which extend around the edges of the screens or plates G and which are preferably substantially of U-shape in cross-section, the closed portion of each gasket being arranged at the outer periphery thereof so as to prevent leakage of water between the meshes of the screens and the gaskets. In this manner the screens are held rigidly in their operative positions and are also insulated from the metal casing of the tanks, since the gaskets are preferably made of rubber or other insulating packing material. If desired, however, the perforate partitions G need not be secured to the tank, or they may be supported on the walls of the tank in any other desired manner.

Each of the compartments formed by the screens or perforate partitions G is preferably filled with suitable material for treating the water passing through the tanks, with the exception of the lower compartment which preferably contains no water treating material and forms a settling chamber for solid matter in the water. Any desired kind of water treating material may be employed, carbon or charcoal and quartz being preferably employed. It is desirable to arrange the charcoal and quartz in such a manner that the two upper chambers of each tank will be filled with quartz and the other chambers alternately filled with carbon and quartz. For reasons hereinafter given, the chambers containing the charcoal are preferably only partly filled with charcoal, as indicated at I, and the upper portions of the chambers as well as the adjacent chambers are filled with quartz, indicated by I'. Quartz and charcoal produce very desirable results when used in this manner. It is not desired, however, to limit the invention to the use of these two materials since other water treating materials may be substituted in place of those mentioned.

In order to prevent the weight of the filtering material from breaking the screens or perforate partitions G of the chambers, the lower chamber is preferably provided with suitable means for supporting the lowest perforate partition. In the construction shown for this purpose the reinforcing member consists of a central, substantially upright post K resting on the bottom C' of the tank and supporting the perforate partition G of the adjacent compartment. The central post K preferably also supports a plurality of radial arms or members $k$ arranged in contact with the lowest perforate partition G and the radial arms $k$ are supported at intervals by means of upright standards or legs $k'$ $k^2$. By filling each of the compartments to the upper level thereof, the perforate partitions of the other compartments may rest upon the water treating materials in the compartments below, so that the perforate partitions or members G are to a large extent relieved of the weight of the material in the compartments.

Under certain conditions of operation in order to effect a thorough cleansing and purifying of the water passing through the tanks, electricity is preferably conducted to each of the perforate members G by means of conductors L L', passing through suitable insulating bushings $l$ to the perforate members G, the alternate members being connected to the opposite sides of an electric circuit. The conductors L L' may receive current from any suitable source of power, not shown. In an installation of this type where carbon is used in treating water, the compartments containing carbon must be only partly filled with carbon, the upper portions of the compartments being filled with quartz or other electrically non-conducting material to prevent short-circuiting two adjacent perforate members G with carbon, which constitutes a good conductor of electricity. By filling the upper portions of the compartments containing carbon with quartz, the strain on the perforate members G, due to the weight of the material in the compartments, is relieved.

In order to enable the tanks to be readily cleansed, a washout pipe M is preferably provided in each of the tanks which is controlled by means of a valve $m$. By opening the valve $m$ the solid matter deposited in the lower compartment can be readily washed out, together with impurities which have collected in the other compartments. In order to thoroughly flush and to disinfect or sterilize the interior of the tank without necessitating the opening of the same, flush pipes N for steam or other disinfecting material are provided which preferably enter the top plate C of each tank. These flush pipes are controlled by means of valves $n$ which permit steam or other disinfectant to enter into the tank to sterilize the contents thereof. The glazed lining serves to retain the heat of the sterilizing or disinfecting agent within the tank and thus assists in the sterilizing of the same. The glazed lining, furthermore, owing to its smoothness, can be easily cleaned and does not collect or absorb impurities as readily as a rough interior. In cases where the tank is equipped for electrolysis of the water the glazed lining also acts as an insulator to prevent short circuits within the tank.

As illustrated in the drawings, only the tank A is provided with means for passing electricity through the water which is being treated. If desired, however, the tank B may be similarly equipped or for the filtration of certain waters, the electrolytic action may be dispensed with entirely. The combined action of electricity and the water treating materials in the compartments produces a thorough cleansing and purifying of the water and softening of the same, and the fact that the tanks are so constructed that they can be readily cleansed and sterilized without the trouble of opening the same, greatly facilitates the treating of water.

We claim as our invention:

1. In a water treating apparatus, the combination of a container including a plurality of annular body portions, means for securing said body portions together, a plurality of perforate partitions made of electrical conducting material and dividing said container into a plurality of compartments, said partitions being secured to the container by the means which secure said body portions together, water treating material in said compartments, and means for connecting alternate partitions with the opposite sides of an electric circuit for producing a flow of electricity through the water.

2. In a water treating apparatus the combination of a container including a plurality of separable body portions, flanges on said body portions by means of which the body portions may be secured together, a plurality of perforate partition members dividing said container into compartments, said partition members being clamped between the flanges of said body portions, water treating material in said compartments, and means for connecting alternate partitions with opposite sides of an electrical circuit for producing a flow of electricity through the water.

3. In a water treating apparatus, the combination of a container including a plurality of superimposed body portions, flanges on said body portions by means of which said body portions may be secured together, a plurality of perforate partitions dividing said container into a plurality of compartments, said partitions being clamped between the flanges of said body portions, gaskets placed between said flanges and between which said partitions are secured, said gaskets being substantially of U-shape in cross-section and having their ends arranged at opposite sides of said partitions and extending inwardly relatively to the container whereby the partitions are insulated from the body flanges, and water treating material in said compartments.

4. In a water treating apparatus, the combination of a container including a plurality of superimposed body portions, each adapted to constitute a filtering compartment, flanges on said body portions by means of which said body portions may be secured together, a plurality of perforate partitions dividing said container into a plurality of compartments, said partitions being clamped between the flanges of said body portions, gaskets of insulating material between said flanges and between which said partitions are clamped, means for connecting alternate partitions to the opposite sides of an electric circuit, and water treating material in said compartments.

5. In a water treating apparatus, the combination of a container, a plurality of perforate partitions arranged substantially horizontally in said container and dividing the same into a plurality of compartments, water treating material in each of the compartments with the exception of the lowest compartment, means in said lowest compartment for supporting the weight of the lowest partition, said means including horizontal arms and arm supporting members, said compartments being completely filled with water treating material whereby the weight of the material is supported by said supporting means in said lowest compartment, said lowest compartment forming a settling chamber for solid matter in the water.

6. In a water treating apparatus, the combination of a container, water treating material in said container, the inner walls of said container being provided with a hard, smooth coating to which the foreign material will not rigidly adhere, means for discharging foreign material accumulated in said treating apparatus, and means for admitting a sterilizing medium to the same.

7. In a water treating apparatus, the combination of a container, water treating material in said container, the inner walls of said container being glazed whereby foreign matter will not adhere rigidly to the walls, and means in said container for discharging foreign material accumulated therein.

8. In a water treating apparatus, the combination of a container, water treating material in said container, the inner walls of said container being glazed, a plurality of electrical conductors arranged at intervals in said container, the glazed walls of the container preventing short circuiting of said conductors, and means for connecting said conductors to an electric circuit to cause electricity to flow through the water.

9. In a water treating apparatus, the combination of a container, a plurality of layers of water treating material in said container, means for interrupting the flow of water to said container, means for discharging water and foreign matter from said container, and means for admitting an agent to said container for sterilizing the same when the water is discharged therefrom.

10. In a water treating apparatus, the combination of a container, a plurality of layers of water treating material in said container having smooth non-porous inner side walls, means for interrupting the flow of water to said container, means for discharging water and foreign matter from said container, and means for admitting a flushing and sterilizing medium to said container when the water has been discharged therefrom, whereby the container may be readily cleaned.

11. In a water treating apparatus, the combination of a container, a plurality of perforated partitions arranged in said container and dividing the same into compartments, filtering material in said compartments comprising a layer of carbon with a layer of quartz thereon, and the next adjacent compartment being filled entirely with quartz, said partitions being made of electric conducting material, and means for connecting alternate partitions to the opposite sides of an electrical circuit.

Witness our hands, this 6th day of February, 1919.

JOHN ROCHE.
RAYMOND J. PARKER.

Witnesses:
CHARLES ROCHE,
HOWARD T. MOORE.